United States Patent
Paehl et al.

(10) Patent No.: US 10,932,888 B2
(45) Date of Patent: Mar. 2, 2021

(54) ORTHODONTIC BRACKET AND A METHOD OF MAKING AN ORTHODONTIC BRACKET

(71) Applicant: 3M INNOVATIVE PROPERTIES COMPANY, St. Paul, MN (US)

(72) Inventors: Ralf M. Paehl, Melle (DE); Dietmar Blees, Löhne (DE)

(73) Assignee: 3M Innovative Properties Company, St. Paul, MN (US)

(*) Notice: Subject to any disclaimer, the term of this patent is extended or adjusted under 35 U.S.C. 154(b) by 11 days.

(21) Appl. No.: 15/776,303

(22) PCT Filed: Jan. 23, 2017

(86) PCT No.: PCT/US2017/014499
§ 371 (c)(1),
(2) Date: May 15, 2018

(87) PCT Pub. No.: WO2017/132080
PCT Pub. Date: Aug. 3, 2017

(65) Prior Publication Data
US 2018/0325627 A1    Nov. 15, 2018

(30) Foreign Application Priority Data

Jan. 29, 2016 (EP) .................................. 16153276

(51) Int. Cl.
*A61C 7/16* (2006.01)
*A61C 7/14* (2006.01)
(Continued)

(52) U.S. Cl.
CPC ............... *A61C 7/16* (2013.01); *A61C 7/002* (2013.01); *A61C 7/14* (2013.01); *A61C 7/145* (2013.01);
(Continued)

(58) Field of Classification Search
CPC .. A61C 7/16; A61C 7/002; A61C 7/14; A61C 7/145; A61C 7/148
See application file for complete search history.

(56) References Cited

U.S. PATENT DOCUMENTS 3,085,335 A * 4/1963 Kesling .................. A61C 7/287
433/14
3,128,553 A   4/1964 Begg
(Continued)

FOREIGN PATENT DOCUMENTS

JP    H11-318941     11/1999
WO    WO 2017-132079  8/2017

OTHER PUBLICATIONS

Wiechmann, "Customized Brackets and Archwires for Lingual Orthodontic Treatment", American Journal of Orthodontics Dentofacial Orthopedics, Nov. 2003, vol. 124, No. 5, pp. 593-599.
(Continued)

*Primary Examiner* — Ralph A Lewis
(74) *Attorney, Agent, or Firm* — Kevin Weber (57) ABSTRACT

An orthodontic bracket having a bracket pad (2), and a bracket body (1) extending from the bracket pad. The bracket has a slot (4) for receiving an orthodontic archwire. The slot has a proximal slot side face (4a), a distal side face (4b) and a slot ground face (4c). The bracket has at least one archwire support structure (5a, 5b) that forms a support surface (6a, 6b) in a plane of the slot ground face. The support surface is spaced from the slot ground face. The archwire support structure forms a flat and protrudes in a dimention generally parallel to a slot cross axis. The invention help maximizing the tip control in an orthodontic treatment.

20 Claims, 3 Drawing Sheets

(51) Int. Cl.
  *B33Y 10/00* (2015.01)
  *B33Y 50/02* (2015.01)
  *B33Y 80/00* (2015.01)
  *B23K 26/342* (2014.01)
  *A61C 7/00* (2006.01)
  *B22F 3/105* (2006.01)

(52) U.S. Cl.
  CPC ............ *A61C 7/148* (2013.01); *B22F 3/1055* (2013.01); *B23K 26/342* (2015.10); *B33Y 10/00* (2014.12); *B33Y 50/02* (2014.12); *B33Y 80/00* (2014.12); *B22F 2003/1057* (2013.01)

(56) References Cited

U.S. PATENT DOCUMENTS

| | | | |
|---|---|---|---|
| 3,307,261 A * | 3/1967 | Steiner | A61C 7/12 433/15 |
| 7,264,468 B1 | 9/2007 | Kesling | |
| 9,622,834 B2 | 4/2017 | Chapoulaud et al. | |
| 10,687,918 B2 | 6/2020 | Paehl et al. | |
| 2002/0197581 A1 | 12/2002 | Georgakis et al. | |
| 2004/0086825 A1* | 5/2004 | Lai | A61C 7/28 433/11 |
| 2012/0015315 A1* | 1/2012 | Wiechnnann | A61C 7/002 433/8 |
| 2014/0065566 A1* | 3/2014 | Lai | A61C 7/145 433/9 |
| 2017/0178423 A1* | 6/2017 | Wright | G06Q 40/08 |

OTHER PUBLICATIONS

International Search Report for PCT International Application No. PCT/US2017/014499, dated Apr. 5, 2017, 6 pages.

* cited by examiner

ORTHODONTIC BRACKET AND A METHOD OF MAKING AN ORTHODONTIC BRACKET

CROSS REFERENCE TO RELATED APPLICATIONS

This application is a national stage filing under 35 U.S.C. 371 of PCT/US2017/014499, filed Jan. 23, 2017, which claims the benefit of EP Application No. 16153276.7, filed Jan. 29, 2016, the disclosures of which are incorporated by reference in their entireties herein.

FIELD OF THE INVENTION

The invention relates to an orthodontic bracket which has a slot for receiving an archwire, and an archwire support structure which is arranged in addition to the slot. The invention further relates to an orthodontic appliance comprising such an orthodontic bracket and a method of making such an orthodontic bracket.

BACKGROUND ART

Orthodontic brackets are used in orthodontic treatments for moving teeth from an initial position to a desired position in a patient's dentition. The initial position typically refers to a position at the beginning of an orthodontic treatment, for example a position in which the labial faces of the teeth are misaligned to each other, whereas in the desired position the labial faces of the same teeth may be generally aligned.

For example, the patient's teeth may be aligned relative to each other to provide the dentition with a more aesthetically pleasant appearance. Further, one or more teeth may be moved within the dentition to compensate for a malocclusion. Such a movement of a tooth or teeth can be typically achieved by using brackets attached to the teeth. The brackets are typically connected to an elastic archwire for applying forces that urge the teeth toward desired positions over a longer term. Several brackets connected to the archwire are typically referred to as orthodontic appliance in the field of orthodontics.

Often orthodontic brackets are off-the-shelf products which are configured for use with clinical situations of different patients. Further there are customized orthodontic brackets which are typically made to fit with an individual clinical situation of one particular patient.

For example US 2012/0015315 A1 (Wiechmann et al.) discloses a customized orthodontic bracket system which includes a bracket having a customized bracket bonding pad for bonding the bracket to a tooth of a patient and a bracket slot adapted to receive a customized archwire. The customized archwire is adapted to be positioned in the bracket slot to form a precise bracket slot-archwire interface.

There is a general desire for an orthodontic appliance that it can be easily mounted to a patient's teeth. This is to avoid errors, inaccuracies and additional costs during mounting of the appliance and to maximize patient comfort. On the other hand, there is a desire that the orthodontic appliance is capable of controlling the movement of each tooth in three dimensions including twisting about these three dimensions. In orthodontics the three dimensions are typically based on a three-dimensional Cartesian coordinate system individually defined for each tooth. Further, the dimensions of the twisting about these axes are typically referred to as "torque", "rotation" and "tip". Typically the term "torque" refers to twisting the tooth about the mesial-distal tooth axis, which is defined in a dimension tangential of a neutral line along which the dental arch extends. The term "rotation" typically refers to a twisting about the tooth axis (or coronal-apical tooth axis), which is defined in a dimension between the root and the occlusal or incisal side of the tooth. The tooth axis is typically or is desired to be approximately vertical according to a parallel to the anatomical vertical body axis. Further, the term "tip" typically refers to a twisting the tooth about the vestibular-lingual tooth axis, which is defined in a dimension between the cheek or lip and the tongue. The tooth axis, the mesial-distal tooth axis and the vestibular-lingual tooth axis typically meet in approximately a center of the tooth.

Although a variety of different brackets and bracket systems are on the market there is still a desire to provide a bracket system which is maximized with respect to its capability of controlling the movement in different dimensions and orientations.

SUMMARY OF THE INVENTION

In one aspect the invention relates to an orthodontic bracket. The orthodontic bracket (further referred to as "bracket") comprises a bracket pad, and further a bracket body which extends from the bracket pad. The bracket has a slot for receiving an orthodontic archwire. The slot extends through the bracket body along an archwire axis.

The archwire axis typically generally corresponds to a neutral axis of an archwire that runs through the slots of several brackets installed on the patient's teeth. The archwire axis therefore typically runs essentially parallel to the dental arch. Although the actual archwire typically extends generally U-shaped the archwire axis of the bracket of the invention is preferably straight.

The slot further has a proximal slot side face and a distal side face. The proximal side face is arranged closer to the pad than the distal side face. The proximal and distal side face extend parallel to the archwire axis and further parallel to an archwire insertion axis. The archwire insertion axis is perpendicular to the archwire axis.

The archwire insertion axis generally refers to a dimension in which the archwire is insertable in (and removable from) the slot.

The slot further has a slot ground face that extends parallel to the archwire axis and further parallel to a slot cross axis. The slot cross axis is perpendicular to the archwire axis and the archwire insertion axis.

Accordingly, the archwire axis, the archwire insertion axis and the slot cross axis correspond to the three axes of a Cartesian coordinate system.

The bracket has at least one archwire support structure that forms a flat in a plane of the slot ground face. The support structure or flat is spaced from the slot ground face.

Further, the shape of the support structure or flat is preferably pre-determined independent from the shape of the bracket pad. For example, the support structure may be based on a standardized virtual model that represents the shape of the support structure. Such a standardized virtual model may be stored in a library or database on a computer. For the design of the bracket the standardized virtual model of the support structure may be retrieved from the database and included into the design of the bracket pad. The inclusion into the design of the bracket pad preferably comprises the positioning relative to the bracket.

It has been found that in a bracket system having brackets with an open slot the force exertable by the archwire to the bracket is limited particularly in a direction from the slot toward the slot opening along the slot insertion axis. This limitation is provided by the ligature which typically is formed by an elastic band and which is stretched over the bracket body to restrain the archwire in the slot. Accordingly, also a torsional moment in a plane of the archwire axis and the archwire insertion axis is limited. The archwire support structure allows for maximizing that torsional moment by providing a maximized leverage between the bracket and the archwire, even though the force limitation by the ligature remains the same.

Preferably, the archwire support structure and the support surface or flat have a predetermined distance with respect to the slot ground face. Thus, the torsional moment exertable between the archwire and the bracket in a plane of the archwire axis and the archwire insertion axis can be predictably controlled. Further, the space between the slot ground face and the archwire support structure is preferably pre-determined. In particular, the space is preferably configured to allow a portion of the ligature to run or fit through. Therefore, the bracket of the invention allows for applying off-the-shelf or standardized ligatures as they can be used for brackets having no archwire support structure. Further, therefore the ligature is prevented from getting clamped or compressed between the wire and a part of the bracket.

The flat of the archwire support structure may have four generally straight sides. The four sides may form a rectangle or trapezoid. Therefore, the flat provides for a generally uniform support of the archwire in a cross dimension (laterally of the path along which the archwire runs) of the archwire. This minimizes the generation of any torsional moment within the archwire as it may occur by a non-uniform support of the archwire.

In an embodiment the archwire support structure protrudes in a dimension generally parallel to the slot cross axis. In particular, the archwire support structure may be generally pin-shaped. The archwire support structure may form a free end portion having an end face at its free end and adjacent a circumferential shell with a portion of the shell forming the support structure or flat.

In a further embodiment the archwire support structure protrudes from the bracket body. For example, the bracket body may comprise a bifurcated structure with one portion of that structure comprising the slot and another portion of that structure forming the archwire support structure. In particular for brackets having a customized bracket pad this ensures that the archwire support structure is shaped and suspended at the bracket in a uniform manner over multiple brackets in an orthodontic appliance. This further helps maximizing the accuracy of the control of the torsional moment in the plane of the archwire axis and the archwire insertion axis (=accuracy of the tip control).

In a further embodiment the orthodontic bracket has two archwire support structures. The two archwire support structures are preferably symmetrically arranged on opposite sides of the slot cross axis. However, any non-symmetric arrangement is possible, for example depending on the space available for the archwire support structure in an orthodontic appliance installed in a patient's mouth. Further, the two archwire support structures are preferably spaced at the same distance from the slot ground face.

In a preferred embodiment the support surface or flat in a dimension parallel to the slot cross axis extends from at least the proximal slot side face beyond the distal slot side face. Accordingly, in a dimension away from the bracket pad the support structure or flat ends outside a plane of the distal slot side face. This is to account for any curvature at which the archwire extends in the orthodontic appliance. In particular, in the area of the front teeth the archwire typically runs at a U-shape so that the archwire runs away from the bracket pad in areas outside the slot. Due to the configuration of the support structure or flat, appropriate support of the archwire in such positions can be reached.

In a further embodiment the slot ground face in a dimension parallel to the slot cross axis extends from at least between the proximal and distal slot surfaces and beyond the distal side face outside the proximal and distal slot surfaces. Accordingly, the slot may extend along the archwire axis at a generally L-shaped profile. The vertical part of the L of the L-shape is configured to hold the archwire. On the other hand, the horizontal part of the L of the L-shape allows the slot ground face and the support surface or flat to be jointly machined (for example ground, broached or electrically discharge cut) although the support surface or flat is greater in dimension than distance between the slot side faces.

In a further embodiment the bracket pad has a tooth facing surface and an opposite tissue facing surface. The tissue facing surface refers to the surface of the bracket pad which, in an orthodontic treatment of a patient, faces the tongue in case the bracket is configured for mounting of the lingual side of the teeth. The tooth facing surface refers to the surface of the bracket pad which, in an orthodontic treatment of a patient, faces the tooth. The tooth facing surface is typically provided with an adhesive for bonding the bracket to the tooth. The tooth facing surface and the tissue facing surface are preferably substantially parallel to each other. The tooth facing surface and the tissue facing surface preferably taper toward each other toward at the periphery of the bracket pad. Thus, the bracket can be designed relatively flat or thin so that also the patient comfort during wearing the orthodontic appliance is maximized.

In a further preferred embodiment the bracket body protrudes beyond the tissue facing surface of the bracket pad. This allows for configuring particularly the bracket pad relatively thin. A thin bracket pad is typically more convenient to wear for the patient and further typically provides for mechanical resilience of the bracket pad. The resilience typically provides for a more reliable bond to the patients tooth compared to a stiffer bracket pad.

The brackets of the present invention are preferably configured for mounting on the lingual side of a patient's teeth. Accordingly the brackets preferably are customized for a dentition of an individual patient. In particular, the bracket pad preferably has a three-dimensional shape which conforms to the shape of a portion of the lingual side of the patient's tooth.

In a further aspect the invention relates to an orthodontic appliance. The orthodontic appliance has at least two orthodontic brackets as defined in any of the embodiments of the present invention. The archwire support structure of each of the two orthodontic brackets is preferably spaced at a distance from the slot ground face, and that distance is uniform for the at least two orthodontic brackets of the orthodontic appliance. Further, the orthodontic appliance may have a plurality of brackets for mounting on the anterior teeth (in particular the incisors and/or canines) of a patient's dentition and a plurality of brackets for mounting on the posterior teeth (in particular the pre-molars and/or the molars).

Preferably the orthodontic appliance has an archwire that is generally U-shaped. Thus, the archwire is shaped to substantially match into the slots of the brackets when installed on a patient's dentition. It is noted that a certain mismatch between the shape of the archwire and the positions and orientations of the slots is provided at the beginning of an orthodontic treatment. Accordingly, mounting of the archwire into the slots at that stage causes a tension in the archwire so that the resulting reset forces cause the archwire to urge the teeth in the desired direction/orientation.

Preferably, the archwire is configured ribbonwise. This means that the archwire preferably has a generally rectangular cross-section with the U-shape of the archwire extending about the longer side of the rectangle. Accordingly, the cross-section of the archwire is oriented with the wider side of the rectangle generally parallel to the tooth axis (or the vestibular tooth faces). In such a ribbonwise configuration the surface of the archwire provided by the shorter side may extend in generally one plane (planar wire approach), although the skilled person will recognize that other shapes are possible.

The slot of the bracket of the invention is preferably dimensioned such that the width of the slot (in a dimension parallel to the slot cross axis) corresponds or—accounting for tolerances or a very small play between the archwire and the slot side faces—substantially corresponds to the size of the smaller side of the rectangular archwire cross-section. Further, the slot may be dimensioned to entirely accommodate the archwire within the slot. In particular the slot side faces may be equal or greater in a dimension parallel to the slot insertion axis than the longer side of the rectangular archwire cross-section (with the slot ground face being arranged adjacent or outside an area between the slot side faces). A slot oriented in a bracket in such orientation may also be referred to as "vertical slot".

A ribbonwise archwire in combination with a vertical slot configuration is typically advantageous for a good torque control of a tooth. In this regard the term "torque" for the purpose of the present specification refers to twisting the tooth about the mesial-distal axis or an axis parallel to the mesial-distal axis. Further, the term "tip" for the purpose of the present specification refers to a twisting about the vestibular-lingual axis or an axis parallel to the vestibular-lingual axis. And furthermore, the term "rotation" for the purpose of the present specification refers to a twisting about the tooth axis or an axis parallel to the tooth axis.

It has been found that the brackets of the invention, configured with a vertical slot, provide for a maximized tip control. This is advantageous particularly for the treatment of the anterior teeth which typically also require good torque control. With the present invention the torque control is not affected while the tip control can be maximized.

It is noted that the brackets of the orthodontic appliance may be used with further (different) archwires at the beginning of an orthodontic treatment. Such archwires may have a circular or oval cross-section or may have a square-shaped or rectangular cross-section which are undersized with respect to the width of the slot. Such archwires are typically used to begin the orthodontic treatment with the archwire exerting moderate forces to the patient's teeth to align large malpositions of teeth prior to a treatment for the final tooth alignment. This further helps making the orthodontic treatment acceptable for the patient, because the exertion of high forces to teeth during an orthodontic treatment is typically inconvenient.

In a further aspect the invention relates to a method of making an orthodontic bracket. The orthodontic bracket has bracket pad, a bracket body and a slot for receiving an orthodontic archwire. The method comprises the steps of:
  determining the shape of a tooth facing surface of the bracket pad based on the topology of a patient's tooth;
  determining the shape of a tissue facing surface of the bracket pad based on the topology of a patient's tooth;
  providing a computer model of the bracket pad based on the shapes of the tooth facing surface and the tissue facing surface;
  providing a computer model of the bracket body, the bracket body comprising the slot and at least one archwire support structure,
    the slot extending through the bracket body along an archwire axis and having a proximal slot side face and a distal side face, the proximal side face being arranged closer to the pad than the distal side face, and wherein the proximal and distal side face extending parallel to the archwire axis and further parallel to an archwire insertion axis that is perpendicular to the archwire axis, the slot further having a slot ground face that extends parallel to the archwire axis and further parallel to a slot cross axis that is perpendicular to the archwire axis and the archwire insertion axis,
  wherein the at least one archwire support structure forms a support surface or flat in a plane of the slot ground face that is spaced from the slot ground face; and
  combining the bracket pad and the bracket body or the computer models thereof.

The determination of the shape of a tooth facing surface and the tissue facing surface may be performed physically or virtually (by help of a computer). For example, the outline of the tooth facing surface may be determined virtually on a computer model of the patient's teeth generally as disclosed in US 2012/0015315 A1 (Wiechmann et al.). Accordingly, the patient's teeth or a physical model of the patient's teeth may be scanned to obtain a virtual malocclusion model. The term "malocclusion" refers to a clinical situation in a patient's mouth prior to an orthodontic treatment or prior to a continued orthodontic treatment. Further, a so-called virtual set-up model is obtained either by scanning a physical model (for example a plaster model) in which the teeth are set up in the desired position after the orthodontic treatment, or by computer aid based on the malocclusion model. It is noted that the step of obtaining the malocclusion model is preferable but optional in case the physical set-up model is directly scanned.

There are other possibilities for determining the shape of a tooth facing surface and the tissue facing surface. For example, a manual wax-up may be provided on the physical (malocclusion and/or set-up) model in the shape or a pre-shape of the bracket pad, which is scanned to obtain a computer model of the shape or pre-shape of the tooth facing surface and the tissue facing surface. Further, in another example the shape of a tooth facing surface may be determined manually by marking the patient's teeth of a model thereof with a line of ink.

The bracket body is preferably provided in the form of a computer model of a precursor of the bracket body. Such a precursor typically has one end portion which is pre-shaped in its final shape. The pre-shaped end portion of the bracket body precursor preferably has a pre-shaped head portion (eventually including hooks and/or tie wings) in which the bracket slot can be provided. The at least one archwire support structure may be provided at a preliminary (oversized) shape and may be customized in accordance to the shape and position/orientation of the slot. The opposite other end portion of the bracket body precursor preferably extends at a uniform cross-section. Such other end portion may be (virtually) cut to the required length and shape.

In an embodiment the topology of the patient's tooth corresponds to the shape of a portion of the lingual side of the tooth. Accordingly, the method can be used for making a customized lingual bracket. It is noted, that the tooth facing surface of the bracket pad may have a surface structure, for example a mesh structure, although the overall surface still conforms to the shape of the corresponding tooth.

In a further embodiment the method further comprises the steps of:
  providing a computer model of the orthodontic bracket based on the combination of the computer models of the bracket pad and the bracket body, and
  building up a physical orthodontic bracket or a precursor thereof based on the computer model of the orthodontic bracket.

The computer model of the orthodontic bracket may be obtained by positioning the computer models of the bracket pad and the bracket body relative to each other, and merging the bracket pad and the bracket body relative to each other. The positioning may be based on the position of several bracket pads relative to the patient's teeth and the position of several bracket bodies relative to the archwire. The position of the bracket pads is determined by the position of the patient's teeth. Further, the position of the bracket bodies, on the one hand, can be determined based on the path at which the archwire extends and, on the other hand, based on the position of the bracket pads through which the bracket bodies extend. For example, a virtual archwire or path of the archwire may by designed on a computer to run close and generally parallel to the patient's teeth and desirably flat (planar wire approach). The bracket bodies may be positioned with the head portion to this virtual archwire and oriented so that they each run through the associated bracket pad. Any portions of the bracket body extending beyond the tooth facing surface are preferably virtually cut off.

The computer model of the bracket may correspond to the final shape of the bracket or may be a precursor containing additional volume that can be removed (for example cut, milled, ground, tumbled away etc.). For example, the computer model of the bracket precursor may represent the shape of a lost wax core for molding the bracket in a mold (for example a sand mold). Such a bracket precursor model may comprise negative structures of the mold (gate and risers, for example).

In one embodiment the method further comprises the steps of using the precursor of the orthodontic bracket as a lost mold core for molding a precursor of the orthodontic bracket.

In a further embodiment the method comprises the step of removing material from the orthodontic bracket precursor to form orthodontic bracket. The method may particularly comprise the step of cutting the slot into the (physical) bracket precursor. Further, the method may comprise the step of tumbling or polishing. Thus, the final bracket can be provided by one or more material removal steps.

In one embodiment the orthodontic bracket or precursor is built up from metal. Suitable metals may be gold, gold alloys and cobalt-chromium alloys, for example. The orthodontic bracket or precursor may for example be built up using Selective Laser Melting or Selective Laser Sintering.

DETAILED DESCRIPTION OF THE INVENTION

Figure 1:
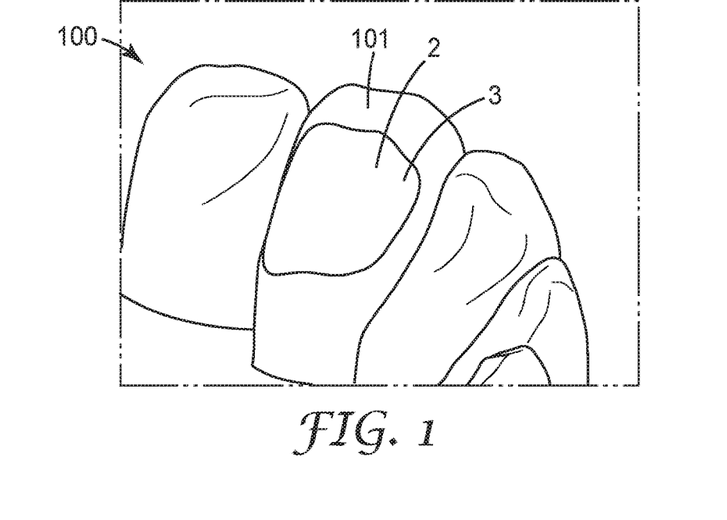
FIG. 1 is a perspective view of a computer model of a bracket pad of a bracket according to an embodiment of the invention.

FIG. 1 illustrates a portion of a computer model of a patient's dentition 100. A bracket pad 2 is arranged on a tooth 101 of the patient's dentition 100. The dentition model 100 can be scanned directly from a patient's mouth or from a physical model of the patient's teeth. Such physical model is typically prepared from making a dental impression replicating the negative shape of the patient's teeth, and casting a positive plaster model by using the dental impression as a mold. In the example, the dentition model 100 represents the malocclusion of the patient's teeth. A physical model may further be provided by 3D printing based on a computer model obtained by scanning.

The bracket pad 2 has a tissue facing surface 3, which in the example is a tongue facing surface. This is because the bracket pad is arranged on the lingual side of the tooth 101. The bracket pad 2 further has a tooth facing surface (not visible in this view) on the opposite side of the tissue facing surface. The tooth facing surface conforms in shape to the shape of the lingual side of the tooth 101. Further, because in the example the tissue facing surface is derived from the tooth facing surface or the lingual side of the tooth, the tissue facing surface also generally conforms in shape to the shape of the lingual side of the tooth 101. Therefore the bracket pad has a generally uniform thickness, although the bracket pad may be modified in a subsequent step to provide a periphery of the bracket pad with a tapered and/or rounded outer edge.

Figure 2:
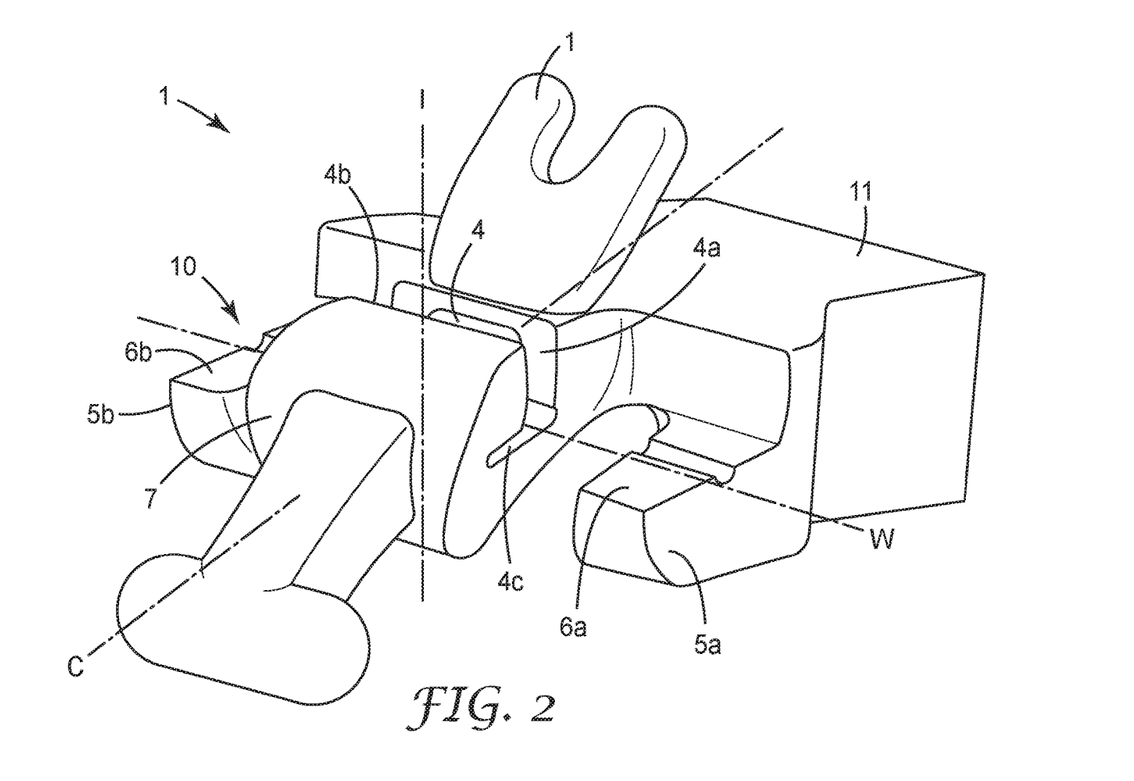
FIG. 2 is a perspective view of a computer model of a bracket body of a bracket according to an embodiment of the invention.

FIG. 2 shows an exemplary computer model of a bracket body 1. Although a computer model of the bracket body is illustrated, it is further referred to simply a "bracket body" in the following. The bracket body 1 may be obtained from a library which is accessible by the computer that stores the bracket body 1. The bracket body 1 has a slot 4 for receiving an orthodontic archwire (not shown). The slot 4 extends through the bracket body 1 along an archwire axis W. The slot 4 has a proximal slot side face 4a and an opposing distal side face 4b. The proximal and distal side face 4a, 4b extend parallel to the archwire axis W and further parallel to an archwire insertion axis I. The archwire axis W and the archwire insertion axis I are perpendicular to each other. The slot 4 has further a slot ground face 4c that extends parallel to the archwire axis W and further parallel to a slot cross axis C. The slot cross axis C is perpendicular to the archwire axis W as well as to the archwire insertion axis I.

The bracket body 1 further has two archwire support structures 5a, 5b. Each of the archwire support structures 5a, 5b forms a flat 6a, 6b. The flats 6a, 6b are within an (imaginary) plane of or flush with the slot ground face 4c. Further, the flats 6a, 6b each are spaced from the slot ground face 4c. The bracket body 1 has a head portion 7 which in the example has a tie wing 8 and a hook 9 which on the final bracket serve for retaining a ligature. The bracket body 1 has a first end portion 10 and, opposite thereof, a second end portion 11. The first end portion 10 is pre-shaped and in the example has the slot 4, the support structures 5a, 5b, the tie wing 8 and the hook 9. Further, the second end portion 11 extends at a generally uniform cross-section, in the example rectangular. The bracket body 1 is a precursor of the finally shaped bracket body with respect to the length of the second end portion 11. The second end portion 11 is typically shortened in a subsequent step of the bracket design. It is noted that the model of the bracket body 1 may further be a precursor with respect to the first end portion in that the initial presence and/or angulation of the slot 4 is optional. Further, the slot 4 and the support structures 5a, 5b may be adjustable in their angle relative to a dimension in which the second end portion 11 extends.

The wire support structures 5a, 5b are arranged at a pre-determined distance from the slot 4, in particular from the slot ground face 4c. Thus, a bracket obtained from this design allows for a predictable tip control of a tooth in a patient's mouth. Further, the space between the wire support structures 5a, 5b and the slot ground face 4c is preferably dimensioned so that a portion of a ligature can run through without getting significantly compressed or clamped.

Figure 3:
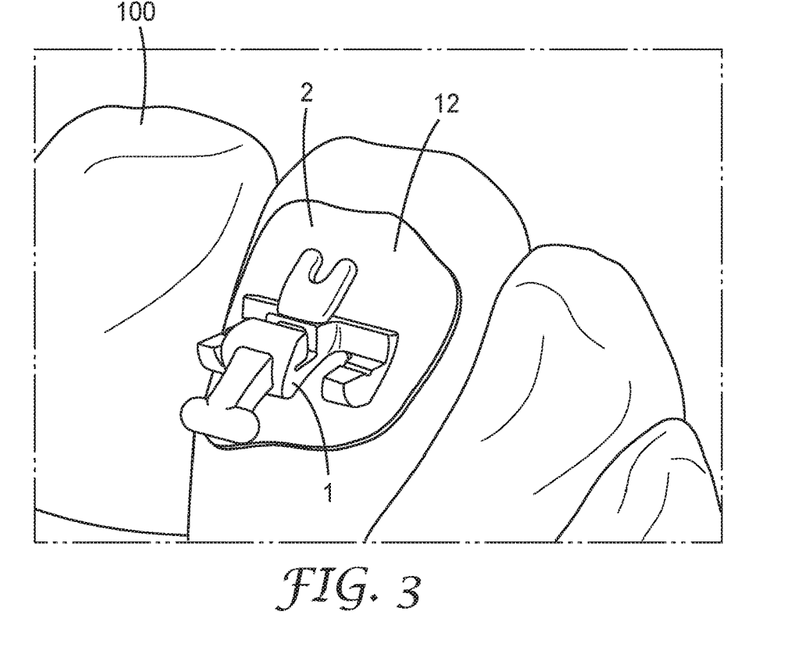
FIG. 3 is a perspective view of a computer model of a bracket according to an embodiment of the invention.

FIG. 3 shows a computer model of a bracket 12 which is obtained by combination of the bracket pad 2 (shown in FIG. 1) and the bracket body 1 (shown in FIG. 2). The combination is typically performed by aid of a computer. Thereby the patient's dentition 100 is typically used to determine the path along which the archwire of the orthodontic appliance should extend, and the path of the archwire is used to align the bracket body 1. Typically, the second end portion of the bracket body 1 is shortened to avoid that it protrudes beyond the tooth facing surface of the bracket pad 2.

Figure 4:
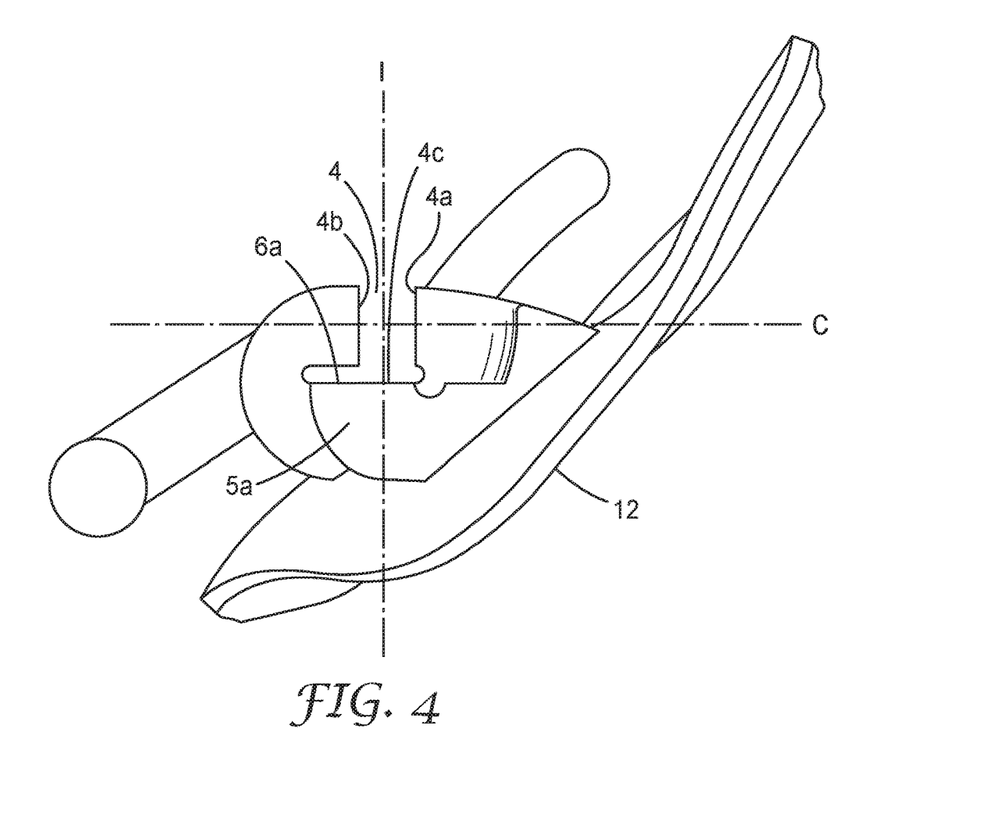
FIG. 4 is a side view of the bracket of FIG. 3.

FIG. 4 shows the bracket 12 in a side view. The Figure illustrates the bracket 12 with the slot 4 including the proximal slot side face 4a, the distal slot side face 4b and the slot ground face 4c. Further, it is illustrated that the flat 6a of the wire support structure 5a is flush with the slot ground face 4c. In the example, the slot insertion axis I is vertical. The slot insertion axis I thus extends generally parallel to the tooth axis (not shown). This type of slot, because of the orientation, is typically referred to as "vertical slot" in the field of orthodontics. A vertical slot is often used in a treatment of anterior teeth with customized lingual brackets. This is because anterior teeth are often undesirably inclined relative to a vertical tooth axis. An orientation of the slot 4 as shown enables for effectively inclining the tooth toward the desired angle. In particular, the two opposing slot side faces 4a, 4b allow for tightly clamping a rectangular wire by a positive fit so that therefore the archwire can transmit a torsional moment to the bracket 12 for inclining the tooth (in a plane of the Figure) as desired. In an orthodontic treatment of anterior teeth it is typically desired that the brackets used for the treatment do not only provide for good torque control but also for a good rotation control. The vertical arrangement of the slot also provides for excellent rotation control (twisting about the tooth axis) due to the positive fit between long side of the archwire and the bracket with respect to a force/torsional moment in a plane of the slot cross axis C and the archwire axis (the plane extending perpendicular to the plane of the Figure).

However, an archwire mounted into the bracket 12 as shown is less effective with respect to exerting a torsional moment about the slot cross axis C. This is because the slot 4 is open at an end opposite of the slot ground face 4c so that the bracket 12 as such does not clamp the archwire by a positive fit in a dimension of the slot insertion axis I. In fact, the archwire is retained in the slot by an elastic ligature. Therefore, any torsional moment about the slot cross axis C which the archwire can exert to the bracket depends on a force the ligature can exert to retain the archwire within the slot. The bracket of the invention provides for a maximized lever between an area in which the archwire is retained by the ligature and the wire support structures 5a, 5b. Accordingly, the bracket of the invention is advantageous in that it provides for a maximized tip control during an orthodontic treatment.

Figure 5:
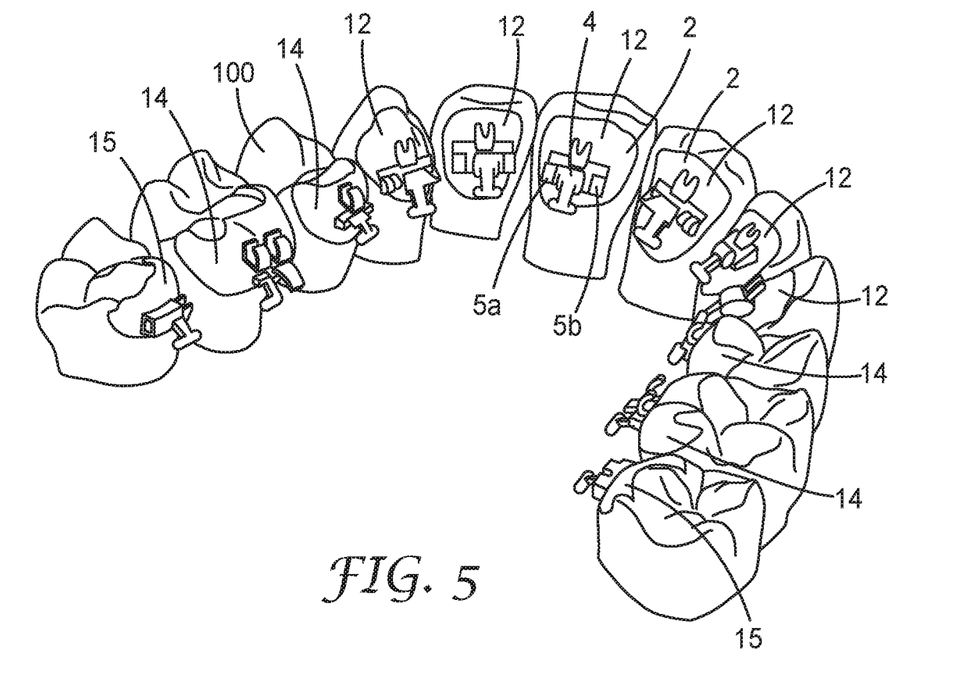
FIG. 5 is perspective view of an orthodontic appliance according to an embodiment of the invention.

FIG. 5 shows a part of an orthodontic appliance comprising a plurality of lingual orthodontic brackets 12 arranged on the front teeth of a patient's dentition 100. The brackets 12 are customized on the respective tooth on which they are arranged. In particular, each bracket 12 has a bracket pad 2 which conforms in shape to the lingual side of the respective tooth. Although the brackets 12 are differently configured they all have a vertical slot 4 and wire support structures 5a, 5b. Therefore the orthodontic appliance provides for good torque, rotation and tip control during an orthodontic treatment.

The orthodontic appliance further has a plurality of further lingual brackets 14 which have a so-called horizontal slot. This arrangement of the slot is advantageous in that it provides good torque and tip control as typically desired for treating posterior teeth. Further, two brackets 15 are arranged at the end of the dental arch or at the end of the archwire. These two brackets 15 have a tube instead of a slot and therefore capture the archwire by a positive lock in a plane of the vestibular-lingual axis and the tooth axis.

Although not illustrated, the orthodontic appliance further typically has an archwire mounted in the slots of the brackets 12, 14 and 15. Further, the orthodontic appliance further typically has a plurality of ligatures fixed on the brackets 12, 14 for retaining the archwire in the slots.

The invention claimed is:

1. An orthodontic bracket comprising:
a bracket pad, and
a bracket body extending from the bracket pad, the bracket having a slot for receiving an orthodontic archwire along a generally occlusal-gingivally extending insertion axis, the slot extending through the bracket body along an archwire axis that is perpendicular to the insertion axis and having a proximal slot side face and a distal side face, the proximal side face being arranged closer to the pad than the distal side face,
wherein the proximal and distal side faces extend parallel to the archwire axis and the insertion axis, the slot further having a slot ground face that extends parallel to the archwire axis and further parallel to a slot cross axis that is perpendicular to the archwire axis and the insertion axis, wherein the bracket has at least one archwire support structure that forms a support surface in a plane of the slot ground face and spaced from the slot ground face forming a void between the slot ground face and the support surface, wherein the archwire support structure forms a flat and protrudes in a dimension generally parallel to the slot cross axis, and wherein the support structure is fixed in location relative to the plane of the slot ground face.

2. The orthodontic bracket of claim 1, wherein the archwire support structure protrudes from the bracket body.

3. The orthodontic bracket of claim 1, having two archwire support structures symmetrically arranged on opposite sides of the slot cross axis.

4. The orthodontic bracket of claim 3, wherein each support surface is fixed in location relative to the slot ground face.

5. The orthodontic bracket of claim 1, wherein the support surface in a dimension parallel to the slot cross axis extends from at least the proximal slot side face beyond the distal slot side face.

6. The orthodontic bracket of claim 1, wherein the bracket pad has a tooth facing surface and an opposite tissue facing surface, wherein the tooth facing surface and the tissue facing surface are substantially parallel to each other, tapering toward each other toward the periphery of the bracket pad.

7. An orthodontic appliance having at least two orthodontic brackets as defined in claim 1, wherein the archwire support structure of each of the two orthodontic brackets is spaced at a distance from the slot ground face, and wherein that distance is uniform for the at least two orthodontic brackets of the orthodontic appliance.

8. The orthodontic bracket of claim 1, wherein the support structure is spaced and separated from the slot ground face.

9. The orthodontic bracket of claim 8, wherein the space between the support structure and the slot ground face is dimensioned to receive at least a portion of a ligature.

10. The orthodontic bracket of claim 1, wherein the bracket lacks material in the plane of the slot ground face between the support structure and the slot ground face.

11. A method of making an orthodontic bracket, that has bracket pad, a bracket body and a slot for receiving an orthodontic archwire, the method comprising the steps of:
determining the shape of a tooth facing surface of the bracket pad based on the topology of a patient's tooth;
determining the shape of a tissue facing surface of the bracket pad based on the topology of a patient's tooth;
providing a computer model of the bracket pad based on the shapes of the tooth facing surface and the tissue facing surface;
providing a computer model of the bracket body, the bracket body comprising the slot and at least one archwire support structure,
the slot extending through the bracket body along an archwire axis and having a proximal slot side face and a distal side face, the proximal side face being arranged closer to the pad than the distal side face, and wherein the proximal and distal side faces extending parallel to the archwire axis and insertion axis, that is perpendicular to the archwire axis, the insertion axis extends in a generally occlusal-gingival direction, the slot further having a slot ground face that extends parallel to the archwire axis and further parallel to a slot cross axis that is perpendicular to the archwire axis and the insertion axis,
wherein the at least one archwire support structure forms a flat support surface in a plane of the slot ground face that is spaced and separated from the slot ground face forming a void between the slot ground face and the support surface, wherein the support structure is fixed in location relative to the plane to the slot ground face, and wherein the insertion axis extends in a generally occlusal-gingival direction;
combining the computer models of bracket pad and the bracket body to create a virtual model of an orthodontic bracket; and
building up a physical orthodontic bracket or a precursor thereof based on the virtual model.

12. The method of claim 11, wherein the topology of the patient's tooth corresponds to the shape of a portion of the lingual side of the tooth.

13. The method of claim 11, further comprising the steps of using the precursor of the orthodontic bracket as a lost mold core for molding a precursor of the orthodontic bracket.

14. The method of claim 13, comprising the step of removing material from the orthodontic bracket precursor to form the orthodontic bracket.

15. The method of claim 14, wherein the orthodontic bracket or precursor are built up from metal.

16. The method of claim 15, wherein the orthodontic bracket or precursor are built up using Selective Laser Melting or Selective Laser Sintering.

17. The method of claim 11, wherein the bracket lacks material in the plane of slot ground face between the support structure and the slot ground face.

18. The method of claim 11, wherein providing a computer model of the bracket body further comprises determining a distance between the slot ground face and the support structure such that a space is created to receive at least a portion of a ligature.

19. The method of claim 11, wherein the bracket pad includes an occlusal region and a gingival region, and wherein the proximal and distal side faces are oriented at an acute angle relative to the occlusal region of the pad.

20. An orthodontic bracket comprising:
a bracket pad, and
a bracket body extending from the bracket pad, the bracket having a slot for receiving an orthodontic archwire along a generally occlusal-gingivally extending insertion axis, the slot extending through the bracket body along an archwire axis that is perpendicular to the insertion axis and having a proximal slot side face and a distal side face, the proximal side face being arranged closer to the pad than the distal side face,
wherein the proximal and distal side faces extend parallel to the archwire axis and the insertion axis, the slot further having a slot ground face that extends parallel to the archwire axis and further parallel to a slot cross axis that is perpendicular to the archwire axis and the insertion axis, wherein the bracket has two archwire support structures that each form a support surface in a plane of the slot ground face and spaced apart from the slot ground face, wherein each archwire support structure forms a flat and protrudes in a dimension generally parallel to the slot cross axis, and wherein the bracket lacks material in the plane of the slot ground face between each support structure and the slot ground face and each support structure is fixed in location relative to the plane of the slot ground face.

* * * * *